United States Patent [19]
Vladimir et al.

[11] Patent Number: 5,940,013
[45] Date of Patent: *Aug. 17, 1999

[54] METHOD AND SYSTEM FOR INTELLIGENCE SUPPORT AND INFORMATION PRESENTATION TO AIRCRAFT CREW AND AIR TRAFFIC CONTROLLERS ON IN-FLIGHT EMERGENCY SITUATIONS

[75] Inventors: Ziberov A. Vladimir; Kupriyanov V. Alexander, both of Schyolkovo-3, Russian Federation

[73] Assignee: Anita Trotter-Cox, Savannah, Ga.

[ * ] Notice: This patent is subject to a terminal disclaimer.

[21] Appl. No.: 08/887,031

[22] Filed: Jul. 2, 1997

Related U.S. Application Data

[62] Division of application No. 08/520,265, Aug. 28, 1995, Pat. No. 5,739,769.

[51] Int. Cl.$^6$ .................................................. G08B 21/00
[52] U.S. Cl. .............................. 340/945; 340/971; 701/9; 701/14
[58] Field of Search ...................................... 340/945, 946, 340/963, 971, 973, 959, 439; 701/120, 3, 9, 14, 15, 16; 395/161, 156, 157

[56] References Cited

U.S. PATENT DOCUMENTS

| | | |
|---|---|---|
| 5,025,382 | 6/1991 | Artz ........................................ 701/120 |
| 5,181,028 | 1/1993 | Sharpe et al. ........................... 340/979 |
| 5,237,305 | 8/1993 | Ishikuro et al. .................... 340/286.01 |
| 5,353,022 | 10/1994 | Middleton et al. ..................... 340/959 |
| 5,454,074 | 9/1995 | Hartel et al. ............................. 701/14 |
| 5,475,594 | 12/1995 | Oder et al. ............................... 701/14 |
| 5,739,769 | 4/1998 | Ziberov et al. ......................... 340/945 |

*Primary Examiner*—Brent A. Swarthout
*Attorney, Agent, or Firm*—Rines and Rines

[57] ABSTRACT

A novel intelligence support of an aircraft crew and the like employing videocards with pictogram signs indicating corrective action to be taken by the crew for emergency flight situations and monitoring the achieving of such corrective action.

7 Claims, 13 Drawing Sheets

METHOD AND SYSTEM FOR INTELLIGENCE SUPPORT AND INFORMATION PRESENTATION TO AIRCRAFT CREW AND AIR TRAFFIC CONTROLLERS ON IN-FLIGHT EMERGENCY SITUATIONS

This application is, in part, a division of application Ser. No. 08/520,265, filed Aug. 28, 1995, now U.S. Pat. No. 5,739,769 and, in part, a supplemental improvement thereupon.

The invention relates to intelligence or intellectual support expert systems (ISS) for use by operators and monitors of complex human-machine-space systems, and more particularly, but not by the way of limitation, for aircraft (AC) crews and air traffic controllers (ATC) activities, and concerns the fashion of the information presentation to AC crew and ATC on their actions during in-flight emergency (IFE) and implementation systems. The invention can also be used in various fields of industrial production, that involve complex operators' and/or technological activities.

BACKGROUND OF THE INVENTION

This invention describes a novel method of providing information to aircraft crew members and flight control personnel during emergency flight situations (EFS) also herein referred to as in-flight emergencies (IFE). The invention is based on the task of providing intelligence support for the aircraft crew for diagnosis and checking workability and functionality of aircraft and systems and subsystems automatically, if emergency flight situations appear; providing visual perception of necessary informational support of the crew for eliminating such EFS or IFE.

An analysis of causes of flight accidents demonstrates that flight safety is much influenced by the quality of information being given to aircraft crews. This problem comes out especially timely as the "glass" cockpit becomes more widely implemented because an effort to squeeze vast amounts of information into a limited surface area of electronic indicators instigates a serious problem of difficulty of perception and is accompanied by insufficient scope of research work in the approaches to encoding of this information.

To solve it, the invention uses a fragmentary-pictographic method of information presentation as a principle of designing the interface of the aircraft intelligence support system. Such fragmentary-pictographic interfacing is an essentially more adequate instrument considering its correspondence to inner (psychological) toolset of mental activity as a whole and of the operator in particular.

In accordance with the invention, this information support is illustrated for each crew member with appropriate prompts in time and form that allow each to understand the intelligence and use it, and in shortest format. Also, it controls operations of each crew member and immediately warns them of mistakes (by "feedback"). This method includes measuring and processing of flight information, for presentation on screens in "videocard" form, divided on four information fields (IF).

For example, a left IF introduces the information about the type of EFS or IFE. A right upper IF may point out which of the crew members must operate. A central upper IF may indicate necessary conditions to eliminate EFS. All such information is introduced in a system of pictogram signs and connected elements-functional lines such as "to do", "to check", "to wait" as later more particularly described in connection with later-described FIG. 4.

This invention is thus a part of an intelligence support system (ISS) of work of complete human-machine-space system operators. It regulates the activity of aircraft crew members and airfield flight or air traffic control leaders and their interfacing. In addition to providing information for treating with emergency flight situations, the invention also may be used in other areas of human activity where complex operation and technologies are involved.

Underlying the invention is an expert system of pictograms to help the pilot of, for example, a helicopter or other craft to accomplish safety flight regimes by checking weight, balance, torque moment during flying with the cargo on the external suspension and inside the fuselage of the helicopter.

Previously known methods have been based on the measuring of flight information, calculation, and showing on the pilot's screen of information about needing engine thrust (power) in different flight conditions according to flight weight and inside cargo, stored into random access memory (RAM) of an onboard computer, and information about ambient temperature and fuel quantity which are also inputted to the computer by the pilot.

By command of the pilot, such systems show on the screen information about fuel quantity, flight altitude, condition of anti-ice system and cargo weight on each of 3 external suspensions. Also the information about flight weight, center of gravity, reserve quantity of fuel, engine type, etc., is inputted manually into random access memory of the computer and may be recovered by the pilot if such is necessary.

The main drawbacks of such prior methods are:
many operations must be done with the control unit of the computer through introducing necessary information by the pilot, such being unacceptable during the flight with EFS;
non-optimal method of introducing information to crew in letter and digit form, requiring too much time for proper understanding;
no options for an expert system to control correct operations of the pilot.

In order more clearly to appreciate the scope of the advance of the invention, it is believed useful more fully to review prior and current aircraft operation techniques.

Piloting of modern aircraft equipped with utmost complex command, indication and control systems, places the aircrew in extremely tough situations of intellectual and psychic activity; this activity often inflicting supreme strain on the crew members. The implementation of wide variety of AC control automatization means, the appearance of computerized trajectory indication systems, systems of hydraulic and electrical remote control of individual AC units (landing gear, high-lift devices) have turned the aircrews from mere amplification elements into high-class high-intellect experts, who are to make complicated qualified decisions in every flight; and this being in a dire lack of time, especially noticeable during in-flight emergency.

There exist various emergency-warning systems on-board modern aircraft. These inform the crew about originating IFE in different ways: by sound or light signals, lighted panels with inscriptions or voice information about the substance of the IFE. Light signals and panels are differentiated by color coding depending on their operativeness and message direction. The main shortcomings of these techniques consist in that they either just draw attention and notify the crew about the IFE arising (not disclosing its nature or pinpointing it, etc.), or present this intelligence by correspondent voice reports or panel inscriptions. In some instances, these systems tell the crew about single actions required in a form of report: "Close the canopy", "Reduce the throttles", etc. Still, in no case, do they give advice on how to parry the IFE, or inform about order and essence of actions needed to cope with an IFE, or how to exercise distribution of duties amongst crew members, or supervise their performances. This results in low efficiency of existing information systems.

Today, the principal instrument of prompting "walk away" from emergency actions to the crew consists of polygraphic editions—Flight Manuals (FM), with which every AC is to be equipped.

Missions to be performed are further complicated by the heavy flow of visual information, which comes to aircrew members through flight and navigation instruments and AC systems. This powerful flow of eternally changing visual information during complex flight stages (for example, take-off, final approach, missed approach) rules out in 60–70% of cases the possibility to find quickly the recommendations on IFE parry actions with the help of existing AC crew advisory systems. Furthermore, the search for the required section (page) in the FM takes long enough time to become unacceptable in transient IFE. Reading the text from the often bulky FM is rather laborious, and an inefficient job at best during the IFE, and often leads to erroneous actions.

Some aircraft manufacturers, such as O.K. Antonov or S. V. Ilyushin Aircraft Works, attempt to resolve this problem by duplicating those sections of the FM that contain the most vital information (section "In-Flight Emergency Situations") and reprinting them as separate polygraphic editions (booklet, a set of cards, etc.) supplied with fast search devices (like indexed outside page margins) with but little improvement. Besides, this appends extra kilograms to already heavyweight collections of operating and maintenance instructions permanently on board the AC (An-124 "Ruslan" carries approximately 500 kilos of such material).

Thanks to fast progress in electronics and avionics, new possibilities of generating more efficient airborne information systems (intellectual support or expert systems for AC crew) have arisen.

In Stokes Alan F., Wickens Christopher D. Chapter 12 "Aviation Displays" in a book "Human Factors in Aviation" Ed. Wiener E., Nagel D.C. New York, 1988, pp. 413–421; the results of ergonomic research in aviation are presented. These show that pictographic systems of indication display have manifest superiority over the other ones, because pictorial or mnemonic presentation offers an integrated portrayal of commanded object standing and the relationship between its components.

In U. S. Pat. No. 4,796,190, as an example, a navigation system aircraft pictographic prompter is described. The system includes a microprocessor and memory therefor, and a compact laser disc comprising the memory. Upon pilot or navigator command, the system displays on a screen the navigation charts of main or reserve arrival airfields along distance estimates with the most characteristic details of geographic area, locator beacons positions, and environmental checkpoints, AC-to-runway present perfect projected paths in azimuth and elevation indications are provided as in the actual AC position relative to the landing maneuver trajectory.

The access to this information is obtained by entering, with the help of an alpha-numerical keyboard, of the full designation of the airport or by a request to find out present AC position. The AC coordinates are displayed as a point leaving a luminescent trace on the screen, representing the flight path. The primary shortcomings of such a system, however, are as follows:

a lot of manipulation on the control panel is required to obtain the desired pilot (navigator) information;

the crew is merely informed about the situation; the optimum decisions are not pointed out, and there is no warning of errors (deviations).

In U.S. Pat. No. 4,780,838, as another example, there is disclosed a helicopter weight and torque advisory system. The system consists of two electronic components: a control panel with a processor unit and a remote display unit. Electrical power is fed into the control panel and processor unit along with signals from the outside air temperature, pressure altitude, fuel flow and anti-ice systems and load sensors on the external sling load hooks. The advisory system is able to compute and display on the pilot's command the available versus required engine torque at selected destination points based on the helicopter operating weight and internal payload in the processor memory, the actual external cargo load lifted, and manually input projected altitude, temperature and remaining fuel at destination. Upon command, the system will display "real time" fuel remaining, fuel flow rate, altitude, temperature, the status of the anti-ice system and the actual load on each cargo hook. In addition, manually input and maintained data such as operating weight, operating weight center of gravity, reserve fuel level and types of engines in the processor's memory are available for quick display.

The control panel portion of the control panel and processor unit consists of an OFF/ON switch, three mode switches, i.e., internal cargo load (INTL), sling load (SLING), and engine torque at destination (DEST). Also it contains a recall key (RCL), a test key (TEST) and a calibration key (CALB). Further, it includes three data keys, CHANGE, SCROLL and ENTER, and remote display brightness control knob.

The remote display unit interfaces only with the control panel and processor unit. Its display consists of three lines with each line capable of displaying four alpha-numeric characters.

The major weaknesses of such systems, however, are as follows:

large number of manipulations with the control panel is required to get necessary information, which is totally unacceptable while operating in complicated flight conditions;

insufficiently optimal from the viewpoint of perception and comprehension of the information the alpha-numerical mode of its presentation;

the impossibility on the part of the advisory system to supervise the accuracy of the pilot's actions.

Thus, an analysis of existing techniques shows, that while today there are ways and means to improve the IFE crew activities, such possess a number of disadvantages that decrease the efficiency of their employment:

1. For aircrew information instruments these drawbacks are:

a large number of manipulations with expert systems controls required to get needed information, which is unacceptable in the conditions of rapid development of IFE;

not optimal from the viewpoint of perception and comprehension of the information presentation—text and/or alphanumerical;

a lack of supervision by the advisory system over the correctness of the aircrew actions;

an impossibility of the expert systems operatively to process AC systems gauges signals and to bring forth the appropriate prompts on the crew actions in various-in-flight situations (the order, essence and required actions directions).

2. For—polygraphic editions (handbooks, Flight Manuals, etc.) they are:

a notable duration (far exceeding the allowed one) of the air crew searching out the required information;

a lack of the supervision by the advisory system over the correctness of the aircrew actions;

not optimal mode of information presentation, which delays its perception and understanding, and does not secure aircrew performance exactitude.

OBJECTS OF INVENTION

The primary object of the invention, accordingly, is to provide a novel method and system of intelligence support for the aircraft crew of flight or traffic control personnel that shall not be subject to the above-described disadvantages and others of prior methods, but to the contrary, provide advancement of safety in flight by raising the efficiency of perception and display of information, with reduction of the probability of wrong crew operations and providing a check of the crew's actions to eliminate EFS or IFE.

A further object is to provide such improvement with the aid of user friendly pictograms or icons operated under appropriate computer control.

Other and further objects will be explained hereinafter and pointed out in connection with the appended claims.

SUMMARY OF THE INVENTION

This invention is dedicated to resolve the above problems through a novel method of and system for intellectual support systems (ISS) for aircraft crew activities, which allow diagnostics in case of IFE, providing the information (prompts) required to "walk away" from the emergency. This prompting is presented to every crew member in due time and in a pattern which allows its quickest comprehension and utilization. The system supervises the performance of each crew member and instantly warns against errors committed (ensure the feedback).

The method of information presentation to aircraft crew and air traffic controller on their actions during emergency comprises the identification and processing of the IFE-notifying signals by an on-board computer complex (OCC) and the exhibiting of the crew-oriented information on display screens with the information presented as a video-card divided preferably in four data fields; an upper left data field carrying information about the nature of the IFE, an upper right field—about the crew members to whom the information is addressed, and upper central field—about the conditions of carrying out the IFE parrying actions, and a lower field—about the essence, modes and order of exercising the "walk away" from emergency actions, this information being presented as a pattern of pictographic signs and linking elements, performed in a form of functional lines, commands or instructions, such as "Execute", "Control" and "Wait".

The method is implemented both in manual and in automatic modes. In the automatic mode, as in the in-flight emergency parry actions are being carried out, the pertinent information comes along into the OCC processor, and then, if actions are adequate, the processor clears the display screens of all such information; but, in case of erroneous order or essence of operations, the processor presents upon the screens the tips or information on which a crew member has committed an error and the way to correct it. After the mistake is corrected, the processor displays information about an ensuing "walk away" from emergency actions.

The method employs videocards preferably with color coding for addresses, functional lines and other information. The on-board computer complex is programmed with a set of such videocards corresponding to the whole assortment of possible in-flight emergencies and associated possible crew errors.

The preferred system comprises an on-board computer complex, comprising the processor, power supply unit connected with its output to the input of the processor, a control unit connected with its output to the input of the processor, an interface (the communication and coordination unit), to the input of which the signals from AC systems and assemblies gauges are fed, this interface output being connected to the processor input; an arithmetic coprocessor with its input and output connected to the processor output and input, respectively; a dynamic random access memory unit with its input and output connected to the processor output and input, respectively; a power self-reliant memory unit (ROM) with its input and output connected to the processor output and input, respectively; a graphics processor connected with its input to the processor; a video-adapter connected with its input to the graphics processor output; and displays at the crew members' working places with their inputs connected to the video-adapter output.

Simulator researches have showed that this method of aircrew information presentation and the device for its implementation can increase by a factor of 4 times, the information-per-unit-of-carrier density without loss of efficiency of information, perception or processing, and to diminish 1.7 times the probability of erroneous actions of the crew members, while raising 1.6 times the rate of operator activities that lessen eyesight fatigue to maintain smart aircrew and air traffic controller support and action, and the supervision over the aircrew "walk away"from emergency actions.

Preferred and best mode techniques and designs are hereinafter detailed.

BRIEF DESCRIPTION OF THE DRAWINGS

The invention will now be explained in connection with the accompanying drawings, FIG. 1 of which shows a block-diagram of an ISS system utilizing the method of the invention.

Figure 12:
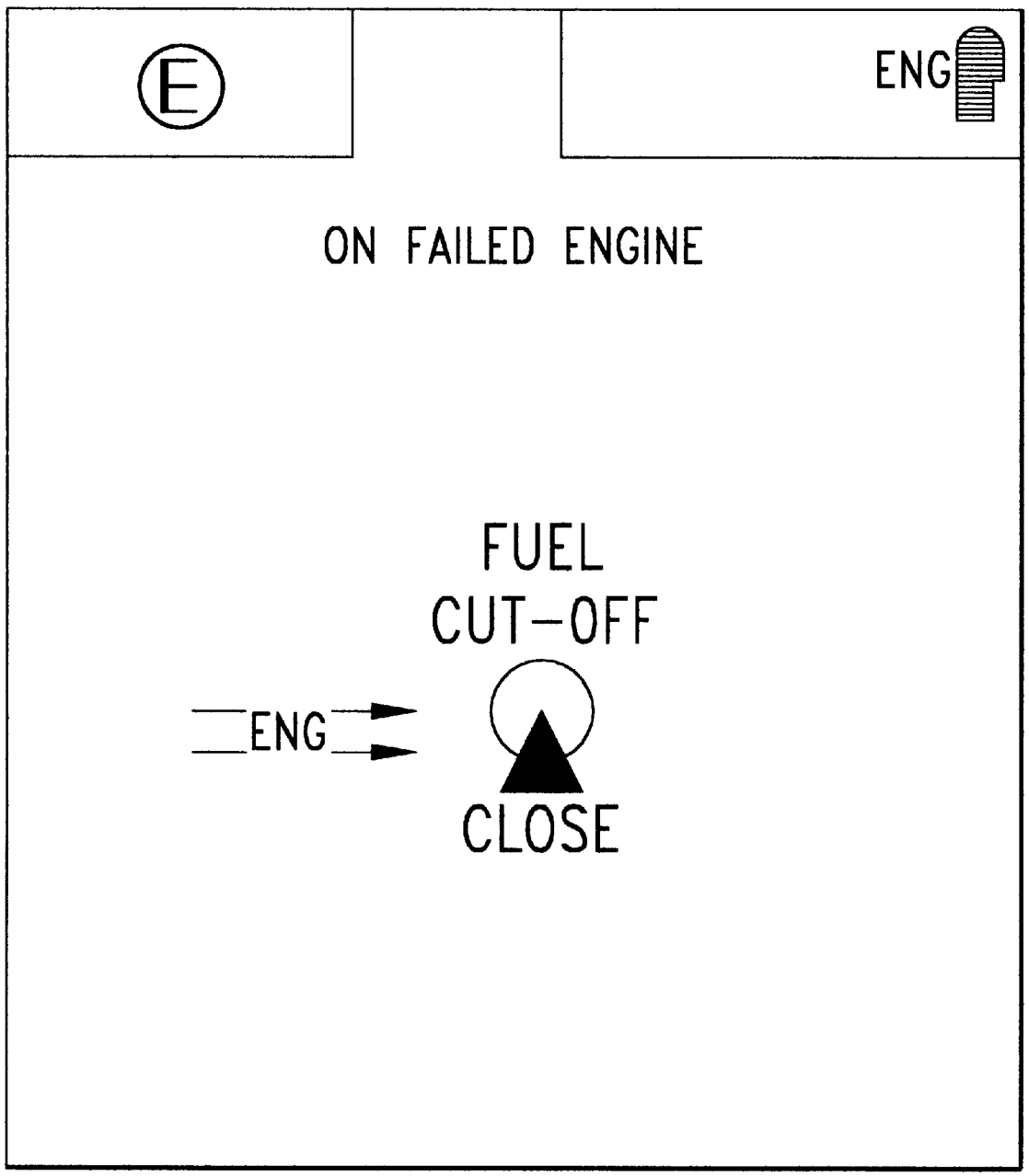
Figure 13:
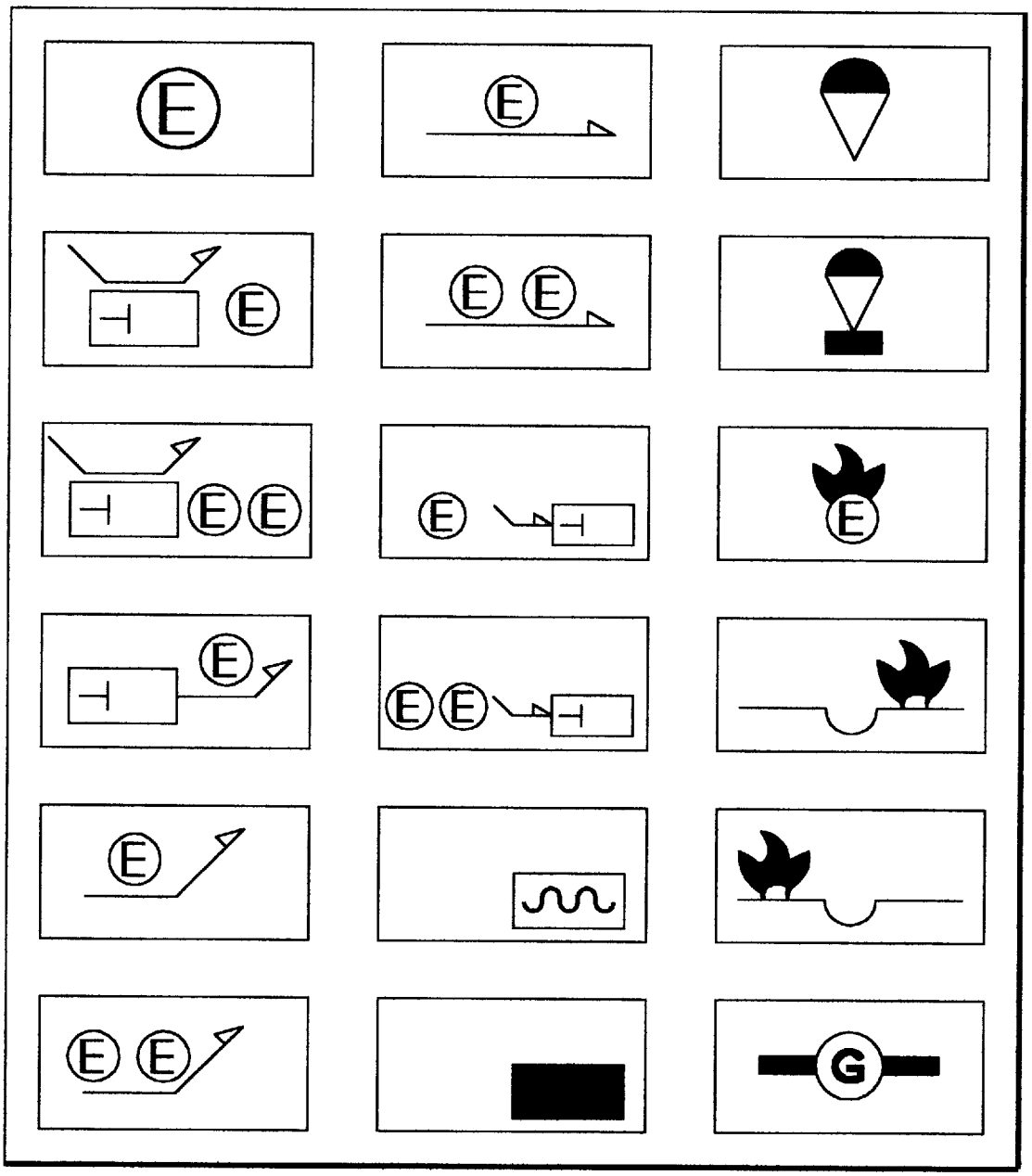

The sequence of the videocards being presented in the ISS automatic mode is illustrated in FIGS. 5,6,7,8,9,10 and 11;

The general appearance of the video-card is case of error of a crew member while warding off the IFE is illustrated in FIG. 12 with an example of the IFE "Engine Failure"; and The menu (the list of the IFE's, written in a power self-reliant memory ROM) outward appearance is illustrated in FIG. 13.

DESCRIPTION OF PREFERRED EMBODIMENT(S) OF INVENTION

The before-described intelligence support of the aircraft crew is based measuring flight information, down-loaded to the onboard computer (BC) or processor 1 and treated according to a special program. All EFS or IFE situations are coded, using pictogram signs and are preinstalled to energy independent read only memory (ROM) 7 of the computer 1. The measured flight information is analyzed by the BC, and if an actual IFE is occurring, the BC introduces on the display, information about the subsequent operations or tasks of crew members to eliminate the IFE.

Figure 1:
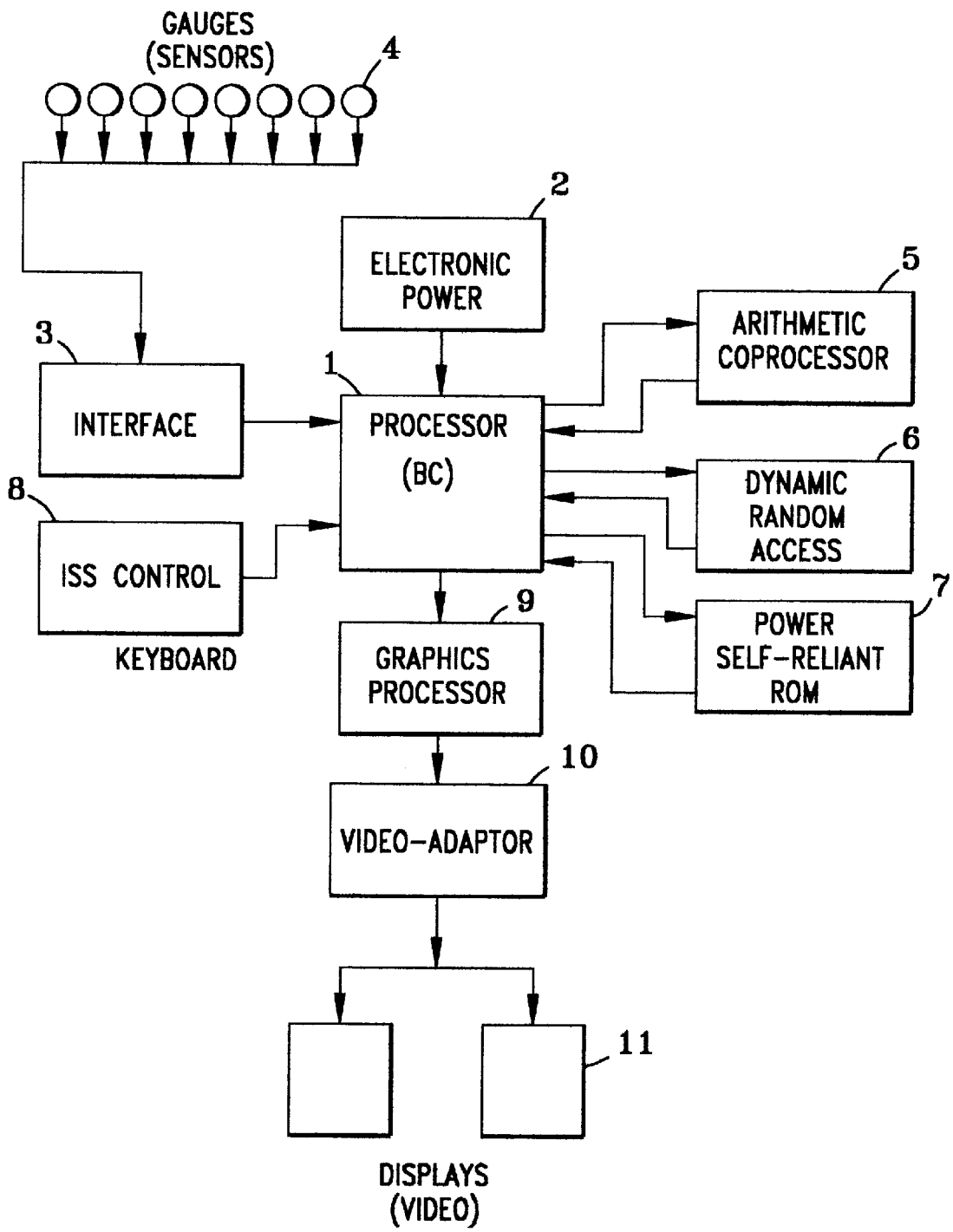

The scheme of the system of FIG. 1 comprises the processor 1 powered from a power supply unit 2. Through an interface 3, signals are fed to the processor 1 consisting of multiplexed analogue-to-digital converter and multiplexed digital converter signals, from sensors or gauges 4 which are installed in assemblies and systems of the aircraft. The processor 1 is coupled functionally through the feedbacks with an arithmetic coprocessor 5, and a dynamic random access 6 and a power self-reliant 7 RAM and ROM memory units respectively. The processor is also connected to the ISS control unit 8 consisting of a key-board panel, a keyboard coding unit and graphics processor 9. A graphics processor is connected to a video-adapter unit 10, which, in turn, is connected with the displays 11 at the aircrew members' working places.

Figure 2:
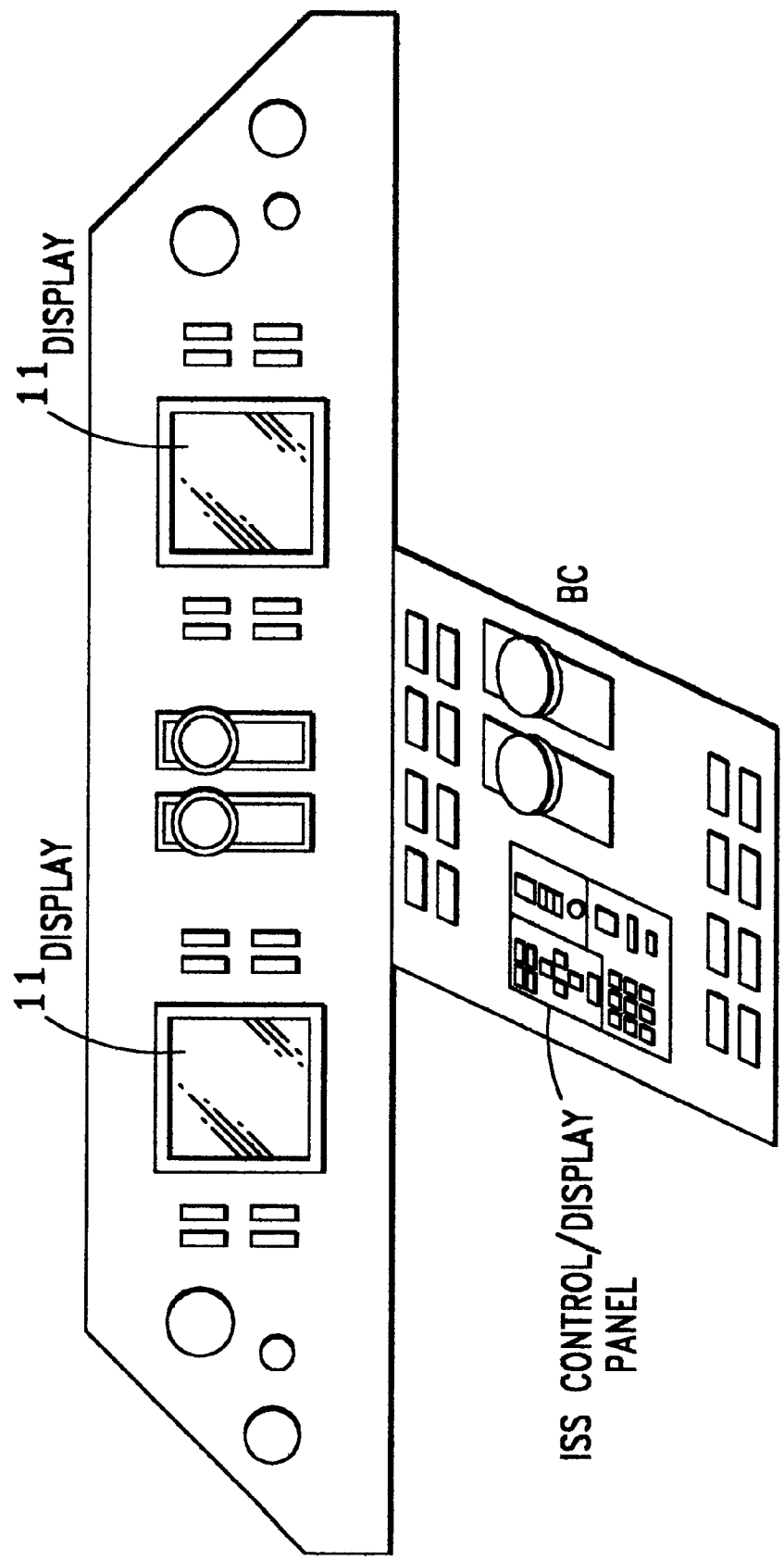
FIG. 2 illustrates the "glass" cockpit of an aircraft with screens and an ISS control panel unit for the intelligence support system (ISS)

The crew cabin display area is illustrated on FIG. 2 at the pilots' working places, where the front instrument panel hosts two displays 11, and the central level panel located between the captain's and co-pilot's seats hosts the ISS control panel.

Figure 3:
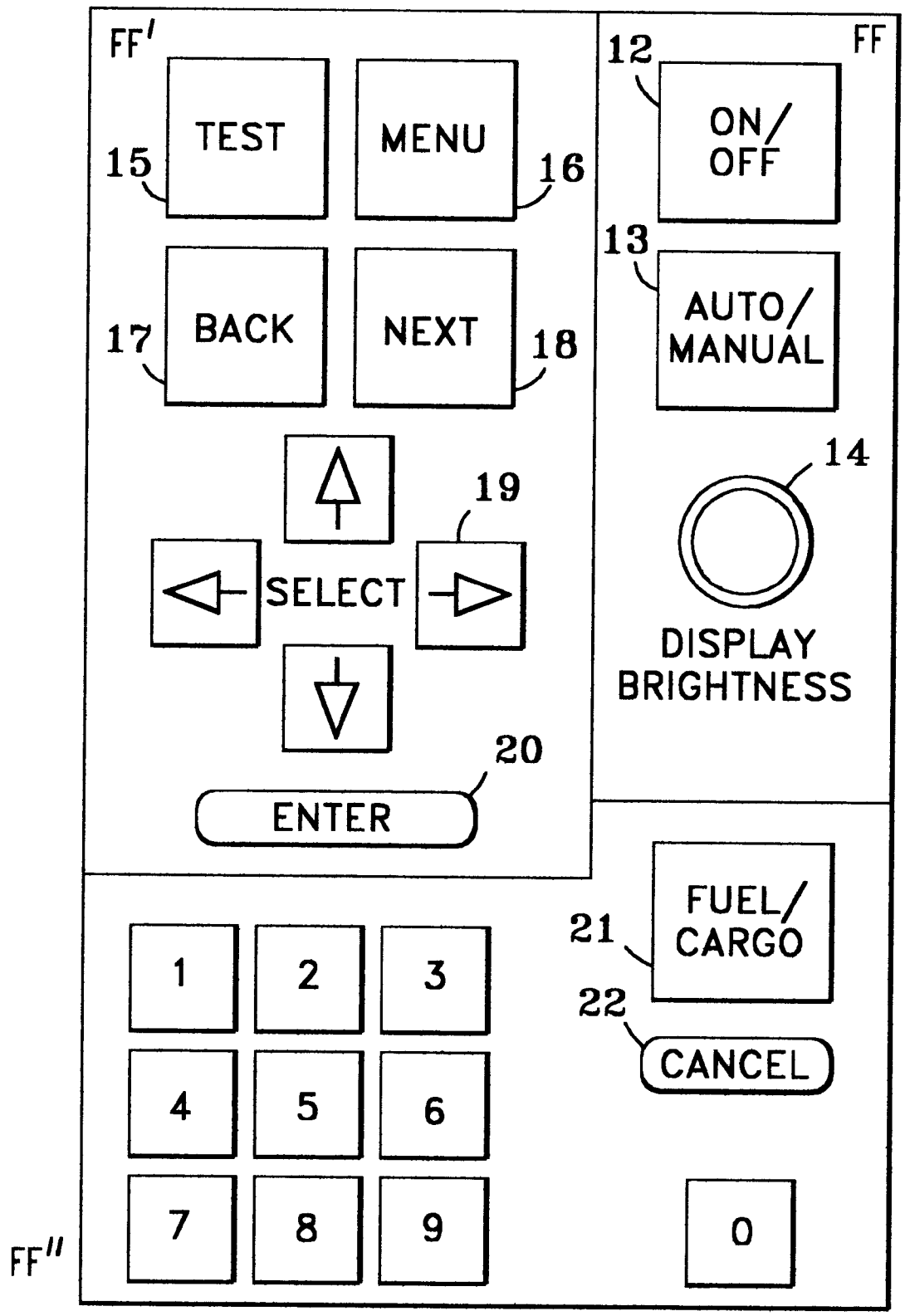
FIG. 3 is a view of the control panel unit of the ISS.

The control panel shown in FIG. 3 consists of three functional fields. On the upper right field (FF), lighted keys 12 ON and 13 AUTO/MANUAL and display brightness control knob 14 are situated. On the upper left functional field (FF$^1$) keys 15 TEST, 16 MENU, 17 BACK, 18 NEXT, 19 SELECT, 20 ENTER are situated. On the lower functional field (FF$^{11}$) numerical keys from 0 to 9, keys 21 FUEL/CARGO and 22 CANCEL are provided.

Figure 4:
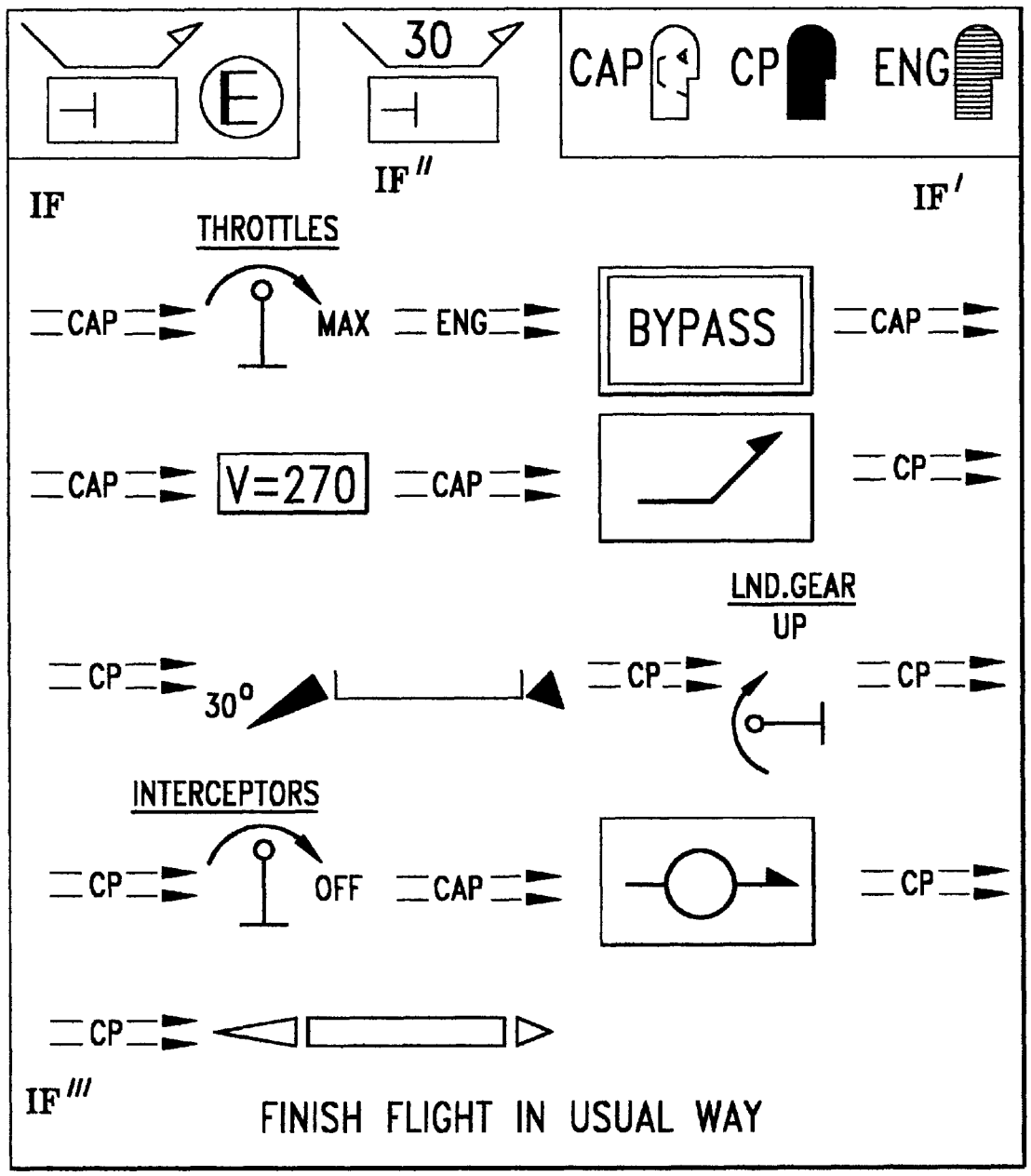
FIG. 4 is an external view of a videocard as presented or shown to the aircraft crew prompting appropriate illustrative EFS or IFE operation such as "Go-around with one failed engine", or "Missed Approach With One Engine Out"

The outward appearance of the video-card presented to the aircrew is shown on FIG. 4 with an example of the IFE "Missed Approach With One Engine Out". In the upper left information field (IF), the report on which in-flight emergency has happened is presented. In the upper right information field (IF$^1$), data is presented on the crew member directly involved in averting the IFE concerned. In the upper central information field (IF$^{11}$), essential conditions to be met while going-around are displayed. Presented in the lower information field (IF$^{111}$), is data required for the missed approach with one engine out operations and their sequence.

The succession of videocards presented to the aircrew in an automatic mode of the ISS is illustrated on FIGS. 5–11 with an exemplary illustration of the IFE "Engine Failure" situation.

Figure 5:
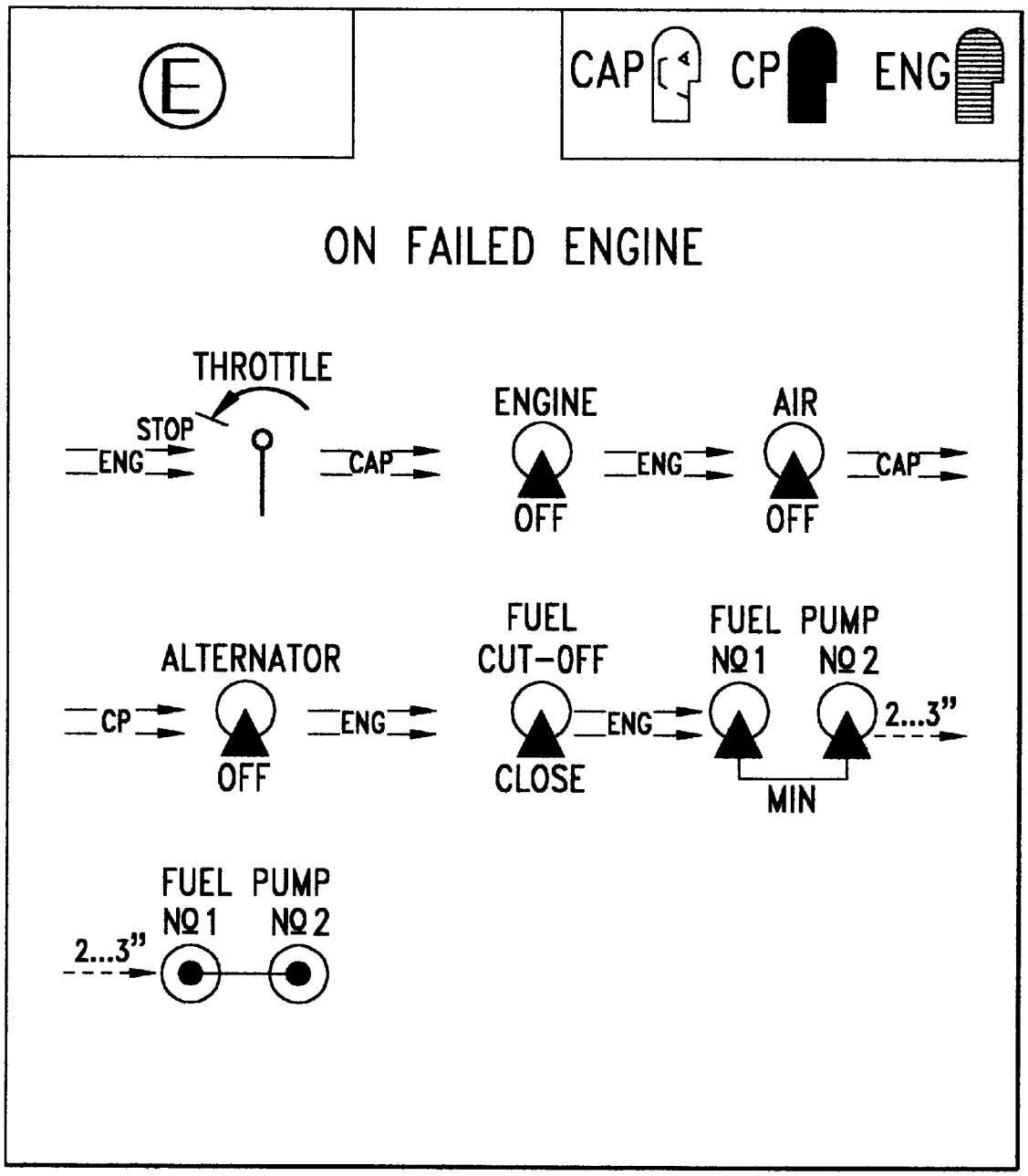
Figure 6:
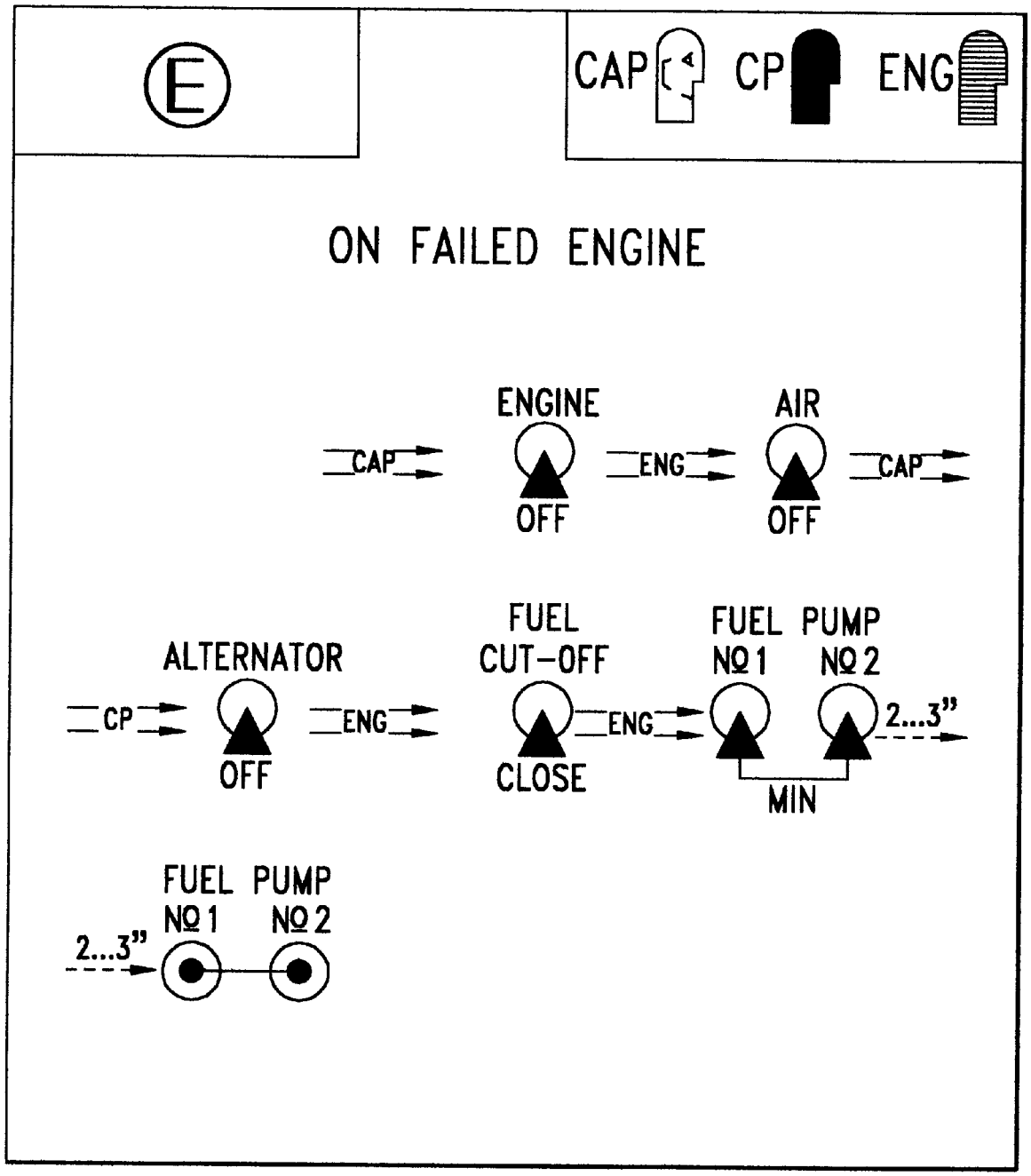
Figure 7:
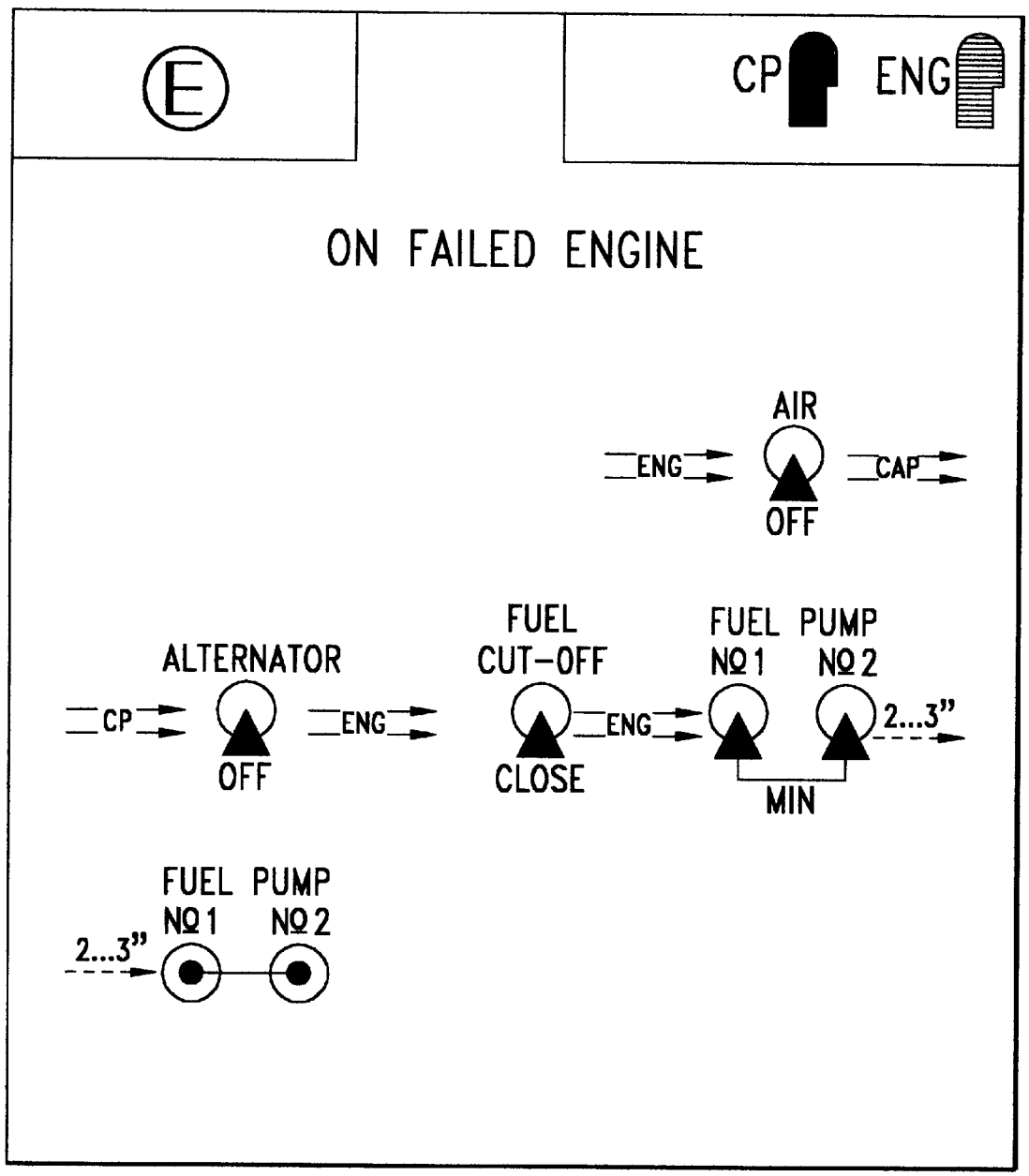
Figure 8:
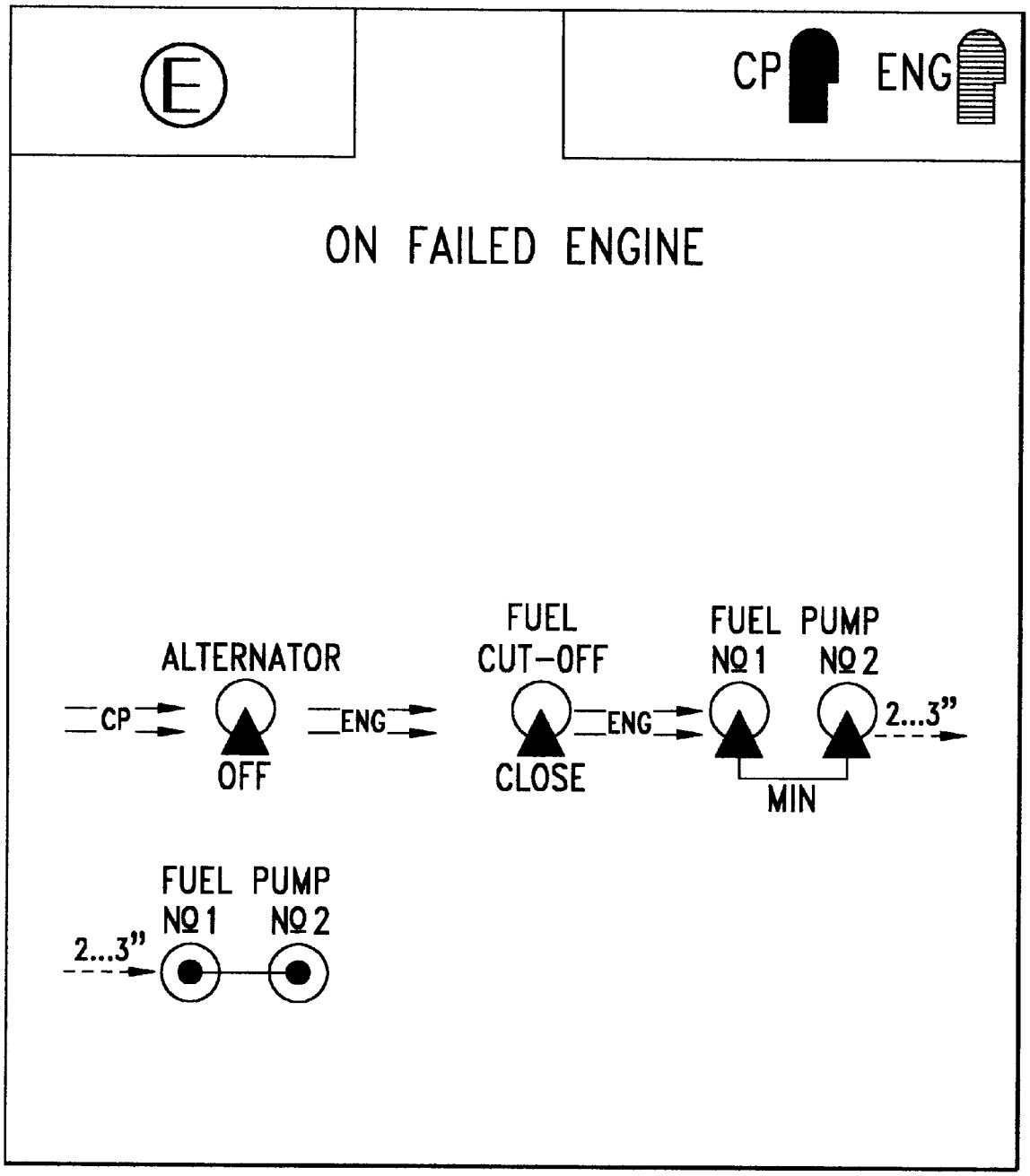
Figure 9:
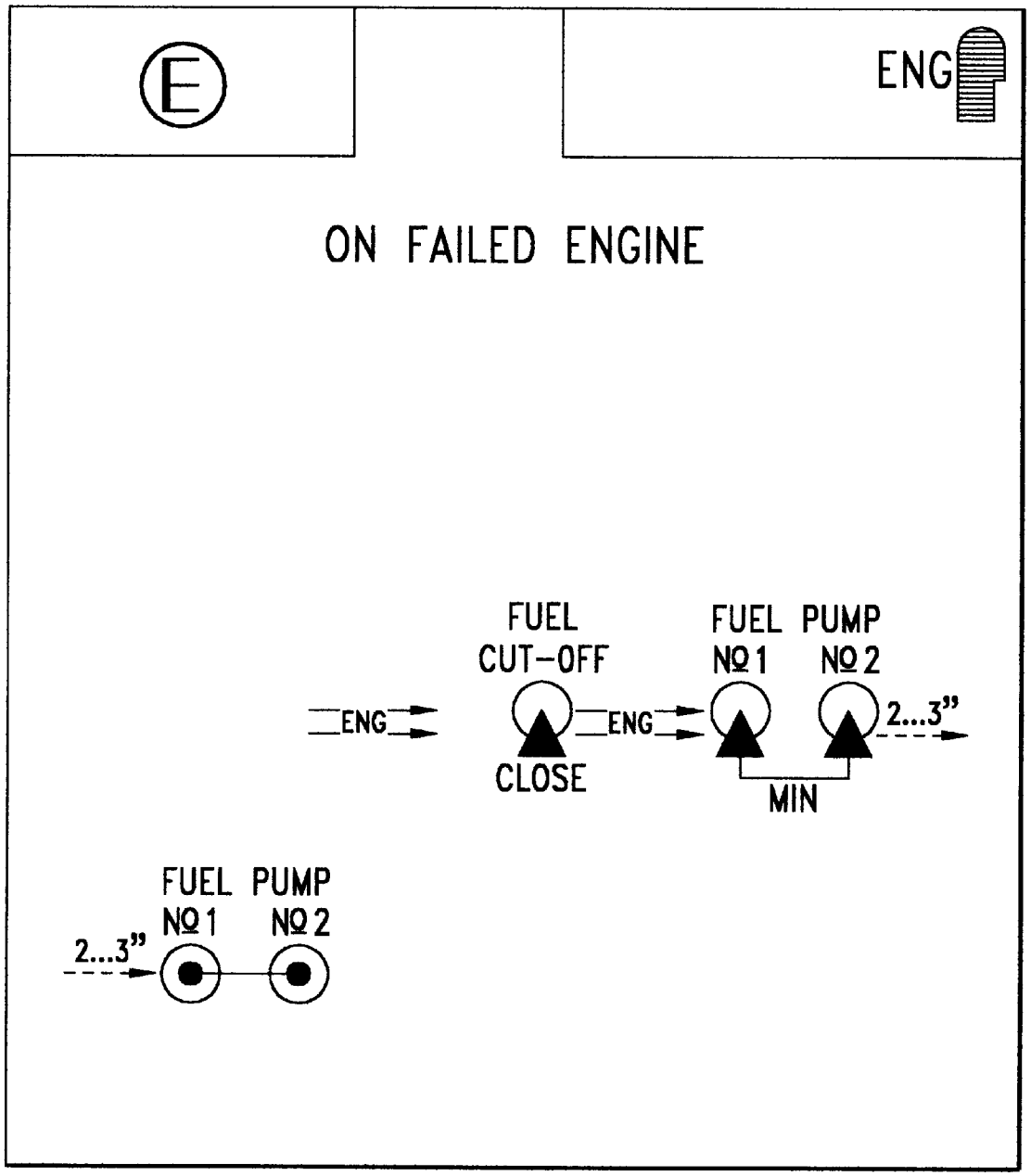
Figure 10:
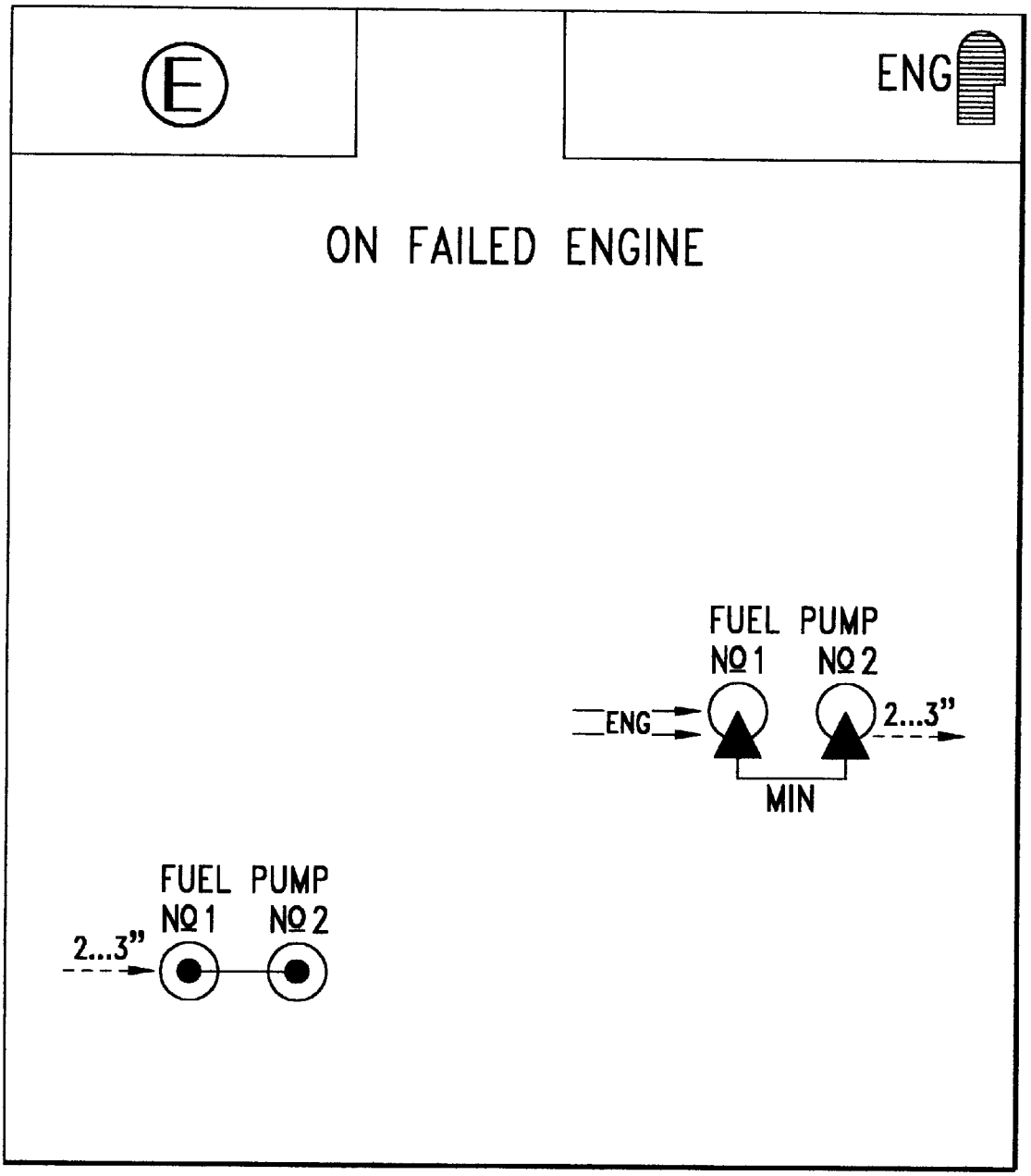
Figure 11:
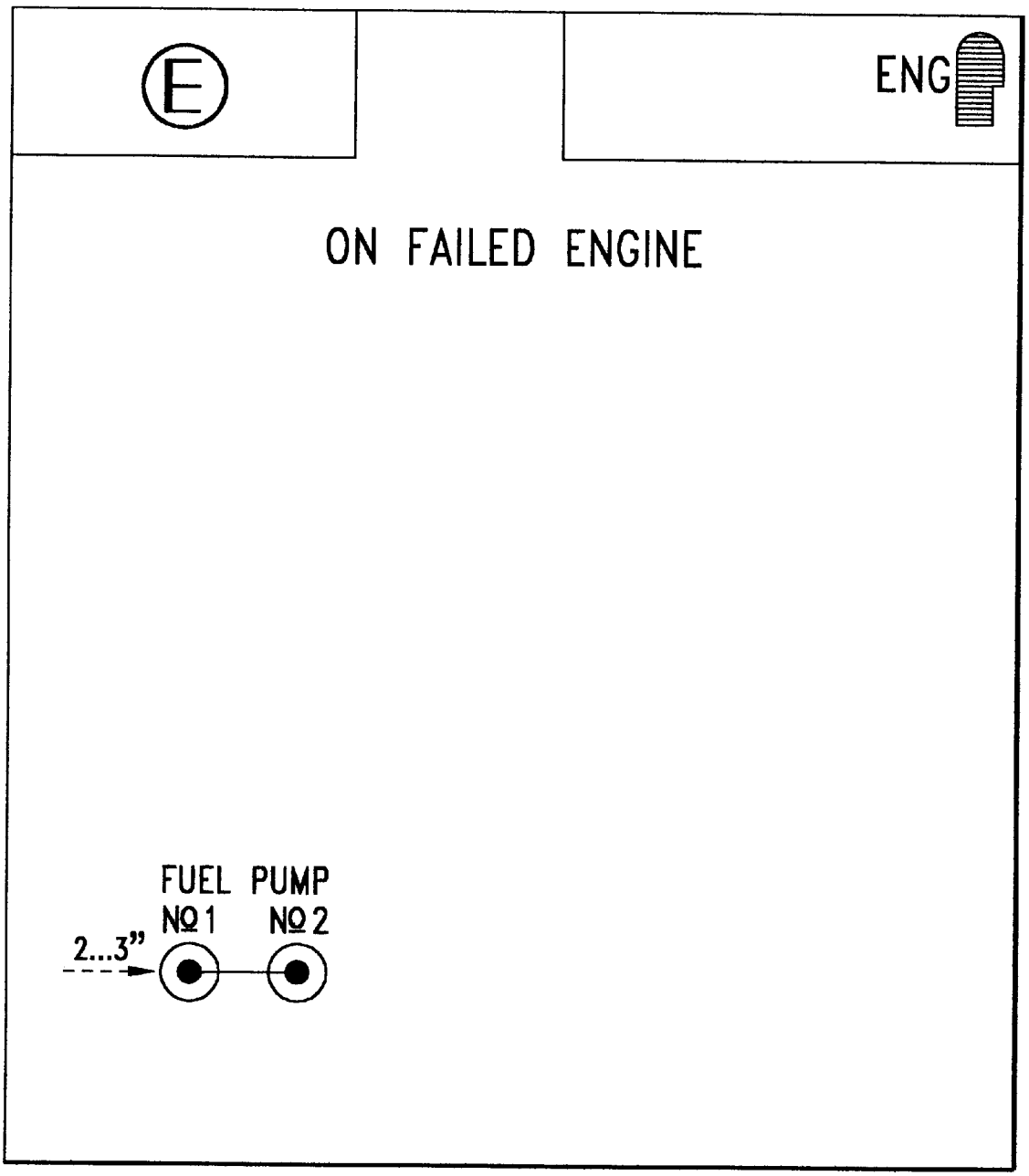

FIG. 5 shows a videocard introduced to the aircrew immediately following the burgeoning of the IFE (just before the crew begins to "walk away" from the emergency). FIG. 6 shows a videocard where the operation is missing (the videocard is exposed to the crew right after the first operation is carried out properly). FIG. 7 shows a videocard where both first and second operations are missing, the upper right information field lacks an addressee to whom all subsequent information does not appertain (the videocard exposed to the crew after the second operation is carried out properly), and so on for FIGS. 8–11.

An appearance of a videocard in case of an erroneous crew member action while averting an IFE is illustrated on FIG. 12 with an example of the IFE "Engine Failure". The upper left information field reports on what in-flight emergency has occurred; the upper right field on what crew member has committed and error, the lower information field presents instructions on how to perform the required operation involved correctly.

The layout of the menu system (the inventory of the IFE situations) is illustrated in FIG. 13, where eighteen pictographically encoded cases of in-flight emergency are shown together.

EXAMPLE 1

Automatic (Primary) Mode of the ISS Operation

Before the mission starts, the ISS is turned on by depressing the key 12 ON, which is situated in the upper right functional field of the ISS control panel (FIG. 3). The green inscription ON illuminates upon actuation of said key 12, and the green plaque AUTO lights on activation of the key 13 AUTO/MANUAL, with front panel displays.

After linking the ISS with the OCC's random access memory unit, the required information is entered via the control panel:

the filled fuel weight;

the weights and the centers of gravity (CG) of the loads located both inside the cargo cabin and as external stores.

The total fuel weight is entered manually into the OCC memory only, if during the flight preparation the fuel tanks were filled partially. The remaining fuel is calculated by the processor automatically throughout the whole flight, using the discrete data from fuel flowmeters. The remaining fuel and the cargo being expended through the mission data make it possible to calculate at any moment the flying weight and the CG of the aircraft to supply the crew with accurate information about their actions in IFE situations.

Before entering the fuel and/or cargo weight with the help of numerical keys situated in the lower functional field of the ISS control panel (FIG. 3), the category of the data to be entered is selected with the key 21 FUEL/CARGO. The selection made is indicated with a corresponding green lighted inscription on this key surface (to change the category the key 21, it is pressed again), and the displays show mnemonic scheme of the aircraft (view from above) and a request "Type in the fuel weights for each tank group", or "Type in the cargo weights and their locations". The positions of fuel tanks and cargo on-board the aircraft is indicated on a screen by a marker with the keys 19 SELECT and 20 ENTER; numerical values are typed in with numerical keys and key 20 ENTER. The fuel or cargo weights entered erroneously or subject to being replaced, as well as their distributions through the tank groups and inside the cargo cabin, are repealed with the keys 19 SELECT and 22 CANCEL. To do this, the marker on a display screen being moved with the keys 19 SELECT is positioned over the figure to be modified, and the unnecessary information is wiped out from the screens by depressing the key 22 CANCEL. If needed, new values of fuel or cargo weight are typed in the vacant place.

In case of an IFE, for example "Engine Failure", the information about IFE comes from the gauges 4 installed in assemblies and systems of the faulty engine into the processor 1; which, being programmed with specific software, identifies and analyses it. Then the essential information (FIG. 5) is shown on the display screens 11, which are situated at the aircrew working places.

All necessary in-flight emergency situation data is stored in the power self-reliant ROM memory unit 7. When the IFE has arisen and is identified, by comparison with the stored situations, to provide faster data exchange, the information concerning the IFE is transferred to OCC random access memory unit 6 and resides there until the whole series of "walk away" from emergency arrangements is carried out. While the specific in-flight emergency is being averted, the OCC processor 1 addresses only the random access memory.

After the information ("prompt") is presented on the display screens 11, the ISS commences to work in a supervision mode—the system gauges 4 registering each operation done and sending the corresponding signal to the OCC processor 1. After the signal is processed, in case the prompted operation is performed correctly, the information about it is cleared from the screens ("dynacue"—"dynamic cue", a realization of the dynamic prompting). FIGS. 5–11 illustrate the sequence of information variation on the display screens that follows the correct "walk away" from the illustrative emergency "Engine Failure" actions. If the crew member has completed rightly all due operations, then the pictographic symbol designating this member and located in the upper right information field of the videocard (FIGS. 7,9) will disappear.

If any crew member has erroneously performed some operation (for exam pie, the flight engineer (FE) has not closed the fuel cut-off valve on the faulty engine), the display screens immediately present a videocard (FIG. 12) bearing the information about who has made the mistake and how this operation is now to be done (close the fuel cut-off valve). After the mistake is set right, the ISS continues to submit the information on further actions to "walk away" from the emergency.

When all parry actions ordered by the ISS are carried out properly, the random access memory 6 of the OCC and display screens are cleared from the information utilized, and the whole system is reset to the initial state by the running software.

EXAMPLE 2

Manual (Reserved) Mode of the ISS Operation

The manual mode of the ISS operation is destined for use when the communication lines to gauges 4 installed in assemblies and systems of the aircraft are broken, or for IFE crew actions' tutorial, or also for ISS usage at the air traffic controllers' working place.

To switch the ISS over to manual mode of operation, it is necessary to turn the ISS on by pressing the key 12 on a control panel (FIG. 3) if it was turned off; then, to switch the operation mode over to MANUAL by pressing the key 13 (the yellow plaques MANUAL must light on the key 13 surface and on the display front panels). After that, the IFE situation mode (inventory) is activated on the display screen by depressing the MENU key 16 (FIG. 13). These situation descriptions are stored in the OCC power self-reliant ROM memory unit 7. The IFE data selection is carried out by moving a marker (a special mark on a display screen) through a menu layout with the SELECT keys 19, and later pressing the ENTER key 20. After that step, the information concerning the actions in the IFE situation pointed out by the marker position in the menu shows itself on the displays 11 as videocards, as illustrated by FIG. 4 and FIG. 5.

Unlike the automatic mode of the ISS operation, the videocard presented in the manual mode is static (the "dynacue" is not effectuated). After the IFE is averted, the ISS is rest to initial state by pressing the TEST key 15, which is situated in the upper left functional field of the control panel. After that, the menu again appears on the screens of the displays (FIG. 13). If this IFE menu videocard does not contain the required in-flight emergency, a new one is called out by depressing the NEXT key 18, etc. To recall the previous videocard the BACK key 17 is to be pressed.

If a videocard is continued, the following page is activated by pressing the NEXT key 18; and the preceding videocard can be reactivated, if necessary, by pressing the BACK key 17.

The switching of the ISS over to automatic mode is performed by pressing the AUTO/ MANUAL key 13, the green plaque AUTO must light on the display front panels and the IFE menu videocard disappears from the screens.

The above examples are by way of illustrations only, the invention more generally making it possible now to dramatically ameliorate the crew-caused accidents statistics and to speed up the performance of certain tasks by implementing the newly designed aircraft crew intelligence support system of the invention.

Further modifications will occur to those skilled in this art, and such are considered to fall within the spirit and scope of the invention as defined in the appended claims.

In conclusion, thus, the invention relates to ergatic systems operator performance intellectual support (expert) systems (ISS), and more particularly, but not by way of limitation, for aircraft (AC) crews and air traffic controllers (ATC) activities, and concerns the fashion of the information presentation to AC crew and ATC on their actions during in-flight emergency (IFE) and device for its implementation. The invention can also be used in various fields of industrial production, that involve complex operator and/or technological activities. This invention is dedicated to resolve a problem of diagnostics in the case of an IFE, to obtain the information (prompts) required to walk away from emergencies. Besides, this prompting is presented to every crew member in due time and in a pattern which allows its quickest comprehension and utilization. The system supervises the performance of each crew member and instantly warns against errors committed (ensuring feedback).

The method of information presentation to aircraft crew and air traffic controller on their actions during emergencies comprises the identification and processing of the IFE-notifying signals by an on-board computer complex (OCC), the information being presented to the crew on display screens as a videocard divided in four data fields; preferably an upper left data field carrying information about the nature of the IFE, an upper right one—about the crew members to whom the information is addressed, an upper central one—about the conditions to be met to walk away from the emergency, and a lower field—about the essence, modes and order of operations to walk away from the emergency—this whole information being presented as a pattern of pictographic signs and linking elements, performed in a form of functional lines, or commands such as "Execute", "Control" and "Wait". The method is implemented both in manual and in automatic modes. In the automatic mode, as the in-flight emergency parry actions are being carried out, the pertinent information comes into the OCC processor, and then, if actions are adequate, the processor clears the display screens of all concerned information; but in case of erroneous order or essence of operation, the processor presents upon the screens the tips on which crew member has committed an error and the way to correct it. After the mistake is corrected, the processor displays information about ensuing walk away from emergency actions. The method employs videocards preferably with color coding to distinguish the addresses, functional lines and other information. The on-board computer complex is programmed with a set of such videocards corresponding to the whole assortment of possible in-flight emergency and associated possible crew errors. The preferred system implementation involves the combination of an on-board computer complex comprising the processor, a power supply unit connected with its output to the input of the processor, a control unit connected with its output to the input of the processor, an interface. (the communication and coordination unit), to the input of which the signals from AC systems and assemblies sensor gauges are fed in, this interface output being connected to the processor input, an arithmetic coprocessor with its input and output connected to the processor output and input, respectively, a dynamic random access memory unit with its input and output connected to the processor output and input, respectively, a power self-reliant ROM memory unit with its input and output connected to the processor output and input, respectively, a graphics processor connected with its input to the processor, a video-adapter connected with its input to the graphics processor output, and displays at the crew members' working places with their inputs connected to the video-adapter output.

What is claimed is:

1. A method of information presentation to an aircraft crew on the crew actions during in-flight emergency situations, comprising identifying and processing in-flight emergency signals by an on-board computer complex; presenting crew-oriented information on screens of displays, in the form of a videocard divided into four data fields, carrying information about the nature of the in flight emergency situation, about the crew members to whom the information is addressed, about the tasks to be carried out, and about the modes of operation overcoming the emergency situation by appropriate emergency actions, this information being presented as a pattern of pictographic signs and linking functional commands.

2. The method of claim 1 and in which the modes of operation are both manual and automatic; in automatic mode, as the emergency action is carried out, feeding the information thereof into the computer and then, provided said actions are correct, clearing from the display screens all information concerning said actions; while, if the actions are wrong, presenting upon the screens the information on the crew member committing an error and the way to correct it; and, after the error is corrected, displaying information about the connected emergency actions.

3. The method of claims 2 and in which color coding of the functional commands and other information is used.

4. The method of claim 1 and in which a set of videocards is stored in the on-board computer complex, this set being in accordance with the number of expected in-flight emergency situations and the corresponding number of crew errors.

5. The method of claim 1 and in which the functional commands include "Execute", "Control" and "Wait".

6. A method of intelligence support of an aircraft crew based on measuring flight information and inputting the same to an onboard computer operating with special software, that comprises, coding possible emergency flight situations information by corresponding pictogram signs and instructions for display; downloading the same to store in the memory of the computer; upon the occurrence of an actual emergency flight situation as determined by the measuring of flight information, identifying such in the computer memory to generate therefrom a corresponding videocard format with the appropriate pictogram signs and instructions, for that situation; displaying to the crew members the generated videocard pictogram signs and instructions; upon the successful fulfillment by the crew of such instructions, removing the videocard display; but upon crew actions in response to such instructions inconsistent with said appropriate pictogram signs presenting from the computer to the crew upon the display what kind of mistake was made, who did it, and how to correct the mistake.

7. A system for intelligence support of an aircraft crew based on measuring flight information and inputting the same to an on board computer operating with special software, the system having, in combination, means for coding possible emergency flight situations information by corresponding pictogram signs and instructions for display; means for storing the same in the memory of the computer; upon the occurrence of an actual emergency flight situation as determined by the measuring of the flight information, identifying such situation among the situations stored in the computer memory to generate therefrom a corresponding videocard format with the appropriate pictogram signs and instructions for that situation; and means operable upon the successful fulfillment by the crew of such instructions, for removing the videocard display; but upon wrong crew action in response to such instructions in consistent with said appropriate pictogram, means for presenting from the computer to the crew on the display what kind of mistake was made, who did it, and how to correct the mistake.

* * * * *